United States Patent
Sloane et al.

(10) Patent No.: US 11,290,475 B2
(45) Date of Patent: *Mar. 29, 2022

(54) SYSTEM FOR TECHNOLOGY RESOURCE CENTRIC RAPID RESILIENCY MODELING

(71) Applicant: Bank of America Corporation, Charlotte, NC (US)

(72) Inventors: Brandon Sloane, Santa Barbara, CA (US); Lydia Lambright, Charlotte, NC (US); Regina Yee Cadavid, San Gabriel, CA (US); Gloria Joo, Moorpark, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 212 days.

This patent is subject to a terminal disclaimer.

(21) Appl. No.: 16/681,067

(22) Filed: Nov. 12, 2019

(65) Prior Publication Data

US 2021/0144162 A1 May 13, 2021

(51) Int. Cl.
*H04L 29/06* (2006.01)
*H04L 41/22* (2022.01)

(52) U.S. Cl.
CPC .......... *H04L 63/1425* (2013.01); *H04L 41/22* (2013.01); *H04L 63/102* (2013.01); *H04L 63/1416* (2013.01); *H04L 63/1433* (2013.01); *H04L 63/1458* (2013.01)

(58) Field of Classification Search
CPC .............. H04L 63/1425; H04L 63/102; H04L 63/1416; H04L 63/1433; H04L 63/1458; H04L 41/22
See application file for complete search history.

(56) References Cited

U.S. PATENT DOCUMENTS

| | | | |
|---|---|---|---|
| 8,468,244 B2 | 6/2013 | Redlich et al. | |
| 8,839,433 B2 | 9/2014 | OReirdan et al. | |
| 9,030,953 B2 | 3/2015 | Purohit | |
| 9,027,125 B2 | 5/2015 | Kumar et al. | |
| 9,094,314 B2 | 7/2015 | Martin et al. | |
| 9,158,919 B2 | 10/2015 | Fortier | |
| 9,172,663 B2 | 10/2015 | Casado et al. | |
| 9,270,694 B2 | 2/2016 | Loder et al. | |
| 9,392,012 B2* | 7/2016 | Becker | H04L 63/1433 |
| 9,462,010 B1* | 10/2016 | Stevenson | H04L 63/0218 |
| 9,537,884 B1 | 1/2017 | Raugas et al. | |
| 9,686,299 B2 | 6/2017 | Stevenson | |
| 9,762,582 B1 | 9/2017 | Hockings et al. | |
| 9,832,201 B1 | 11/2017 | Yu et al. | |

(Continued)

*Primary Examiner* — Sarah Su

(74) *Attorney, Agent, or Firm* — Moore & Van Allen PLLC; Seongun M. Hong

(57) ABSTRACT

A system provides for technology resource centric rapid resiliency modeling. In particular, the system may generate a model for securing technology resources based on compromise vectors that may affect the integrity or security of the resources, along with resiliency controls which may be used by the system to protect the resources. Based on the above information, the system may determine the impact that certain vectors may have on certain resources and assess the resistance of the resources to the impacts. In this way, the system may provide an efficient way to assess resiliency of resources and implement resiliency controls to protect such resources.

20 Claims, 3 Drawing Sheets

(56) References Cited

U.S. PATENT DOCUMENTS

| | | |
|---|---|---|
| 9,930,062 B1 | 3/2018 | Alkemper et al. |
| 9,948,522 B2 | 4/2018 | Marinelli et al. |
| 9,948,652 B2 | 4/2018 | Yu et al. |
| 9,954,884 B2 | 4/2018 | Hassell et al. |
| 9,992,201 B2 | 6/2018 | Hockings et al. |
| 10,015,186 B1* | 7/2018 | Tamir .................. H04L 63/1433 |
| 10,027,711 B2 | 7/2018 | Gill et al. |
| 10,749,888 B2* | 8/2020 | Carmichael ......... H04L 63/1433 |
| 10,904,277 B1 | 1/2021 | Sharifi Mehr |
| 2003/0065942 A1 | 4/2003 | Lineman et al. |
| 2013/0061327 A1 | 3/2013 | Thomas et al. |
| 2013/0215769 A1 | 8/2013 | Beheshti-Zavareh et al. |
| 2013/0247205 A1* | 9/2013 | Schrecker ............. G06F 21/577 726/25 |
| 2014/0156323 A1 | 6/2014 | Prieto |
| 2015/0326601 A1* | 11/2015 | Grondin .............. G06F 21/6245 726/25 |
| 2016/0034838 A1* | 2/2016 | Gembicki ........ G06Q 10/06393 705/7.39 |
| 2017/0331835 A1 | 11/2017 | Yu et al. |
| 2017/0331849 A1* | 11/2017 | Yu ............................ G06F 21/57 |
| 2017/0346846 A1 | 11/2017 | Findlay |
| 2018/0124085 A1 | 5/2018 | Frayman et al. |
| 2018/0146004 A1 | 5/2018 | Belfiore, Jr. et al. |
| 2018/0278642 A1* | 9/2018 | Joy ..................... H04L 63/1433 |
| 2018/0278644 A1* | 9/2018 | Yasutome ................. G06N 5/04 |
| 2019/0104018 A1 | 4/2019 | Casado et al. |
| 2019/0166152 A1 | 5/2019 | Steele et al. |
| 2019/0236661 A1* | 8/2019 | Hogg ................. H04L 63/1433 |
| 2019/0260779 A1 | 8/2019 | Bazalgette et al. |
| 2020/0097663 A1* | 3/2020 | Sato ........................ H04L 67/12 |
| 2020/0106801 A1* | 4/2020 | Evans ................ H04L 63/1433 |
| 2020/0162497 A1* | 5/2020 | Iyer ..................... H04L 63/1433 |
| 2020/0228560 A1* | 7/2020 | Murthy ................. G06F 21/577 |
| 2020/0252423 A1* | 8/2020 | Hogg ..................... G06N 20/20 |
| 2020/0394310 A1* | 12/2020 | Sloane ..................... G06N 3/04 |
| 2021/0064762 A1 | 3/2021 | Salji |
| 2021/0126943 A1* | 4/2021 | Roychowdhury .. H04L 63/1466 |
| 2021/0144162 A1 | 5/2021 | Sloane et al. |
| 2021/0144163 A1* | 5/2021 | Sloane ............... H04L 63/1458 |

* cited by examiner

US 11,290,475 B2

SYSTEM FOR TECHNOLOGY RESOURCE CENTRIC RAPID RESILIENCY MODELING

FIELD OF THE INVENTION

The present disclosure embraces a system for technology resource centric rapid resiliency modeling.

BACKGROUND

There is a need for a way for assessing a system's ability to withstand compromise.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for technology resource centric rapid resiliency modeling. In particular, the system may generate a model for securing technology resources (e.g., applications) based on compromise vectors that may affect the integrity or security of the resources, along with resiliency controls which may be used by the system to protect the resources. Based on the above information, the system may determine the impact that certain vectors may have on certain resources and assess the resistance of the resources to the impacts. In this way, the system may provide an efficient way to assess resiliency of resources and implement resiliency controls to protect such resources.

Accordingly, embodiments of the present disclosure provide a system for technology resource centric rapid resiliency modeling. The system may comprise a memory device with computer-readable program code stored thereon; a communication device; and a processing device operatively coupled to the memory device and the communication device. The processing device may be configured to execute the computer-readable program code to select a technology resource for resiliency assessment; identify a compromise vector having an impact on the technology resource, wherein a magnitude of the impact is associated with the compromise vector; identify, using a resiliency control library, a set of implemented resiliency controls that provide resiliency against the compromise vector; generate, based on the magnitude of the impact associated with the compromise vector and the set of implemented resiliency controls, a resiliency score associated with the technology resource; and present to a user, on a display of a user computing system, a graphical interface comprising the resiliency score.

In some embodiments, the computer-readable program code further causes the processing device to generate a projected resiliency score associated with an additional resiliency control; display, on the graphical interface, the projected resiliency score; and display, on the graphical interface, a recommendation to implement the additional resiliency control.

In some embodiments, the resiliency score is a composite resiliency score generated from a plurality of individual resiliency scores across a plurality of dimensions.

In some embodiments, the compromise vector comprises at least one of a denial of service attempt, unauthorized access, or data modification.

In some embodiments, the impact on the technology resource affects at least one of authorization, authentication, integrity, or availability of the technology resource.

In some embodiments, the computer-readable program code further causes the processing device to display, on the graphical interface, a delta between the resiliency score and the projected resiliency score.

In some embodiments, the computer-readable program code further causes the processing device to display a frequency for encountering the compromise vector.

Embodiments of the present disclosure also provide a computer program product for technology resource centric rapid resiliency modeling, the computer program product comprising at least one non-transitory computer readable medium having computer-readable program code portions embodied therein. The computer-readable program code portions may comprise executable code portions for selecting a technology resource for resiliency assessment; identifying a compromise vector having an impact on the technology resource, wherein a magnitude of the impact is associated with the compromise vector; identifying, using a resiliency control library, a set of implemented resiliency controls that provide resiliency against the compromise vector; generating, based on the magnitude of the impact associated with the compromise vector and the set of implemented resiliency controls, a resiliency score associated with the technology resource; and presenting to a user, on a display of a user computing system, a graphical interface comprising the resiliency score.

In some embodiments, the computer-readable program code portions further comprise executable code portions for generating a projected resiliency score associated with an additional resiliency control; displaying, on the graphical interface, the projected resiliency score; and displaying, on the graphical interface, a recommendation to implement the additional resiliency control.

In some embodiments, the resiliency score is a composite resiliency score generated from a plurality of individual resiliency scores across a plurality of dimensions.

In some embodiments, the compromise vector comprises at least one of a denial of service attempt, unauthorized access, or data modification.

In some embodiments, the impact on the technology resource affects at least one of authorization, authentication, integrity, or availability of the technology resource.

In some embodiments, the computer-readable program code portions further comprise executable code portions for displaying, on the graphical interface, a delta between the resiliency score and the projected resiliency score.

Embodiments of the present disclosure also provide a computer-implemented method for technology resource centric rapid resiliency modeling. The method may comprise selecting a technology resource for resiliency assessment; identifying a compromise vector having an impact on the technology resource, wherein a magnitude of the impact is associated with the compromise vector; identifying, using a resiliency control library, a set of implemented resiliency controls that provide resiliency against the compromise vector; generating, based on the magnitude of the impact associated with the compromise vector and the set of implemented resiliency controls, a resiliency score associated with the technology resource; and presenting to a user, on a display of a user computing system, a graphical interface comprising the resiliency score.

In some embodiments, the method further comprises generating a projected resiliency score associated with an additional resiliency control; displaying, on the graphical interface, the projected resiliency score; and displaying, on the graphical interface, a recommendation to implement the additional resiliency control.

In some embodiments, the resiliency score is a composite resiliency score generated from a plurality of individual resiliency scores across a plurality of dimensions.

In some embodiments, the compromise vector comprises at least one of a denial of service attempt, unauthorized access, or data modification.

In some embodiments, the impact on the technology resource affects at least one of authorization, authentication, integrity, or availability of the technology resource.

In some embodiments, the method further comprises displaying, on the graphical interface, a delta between the resiliency score and the projected resiliency score.

In some embodiments, the method further comprises displaying a frequency for encountering the compromise vector.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
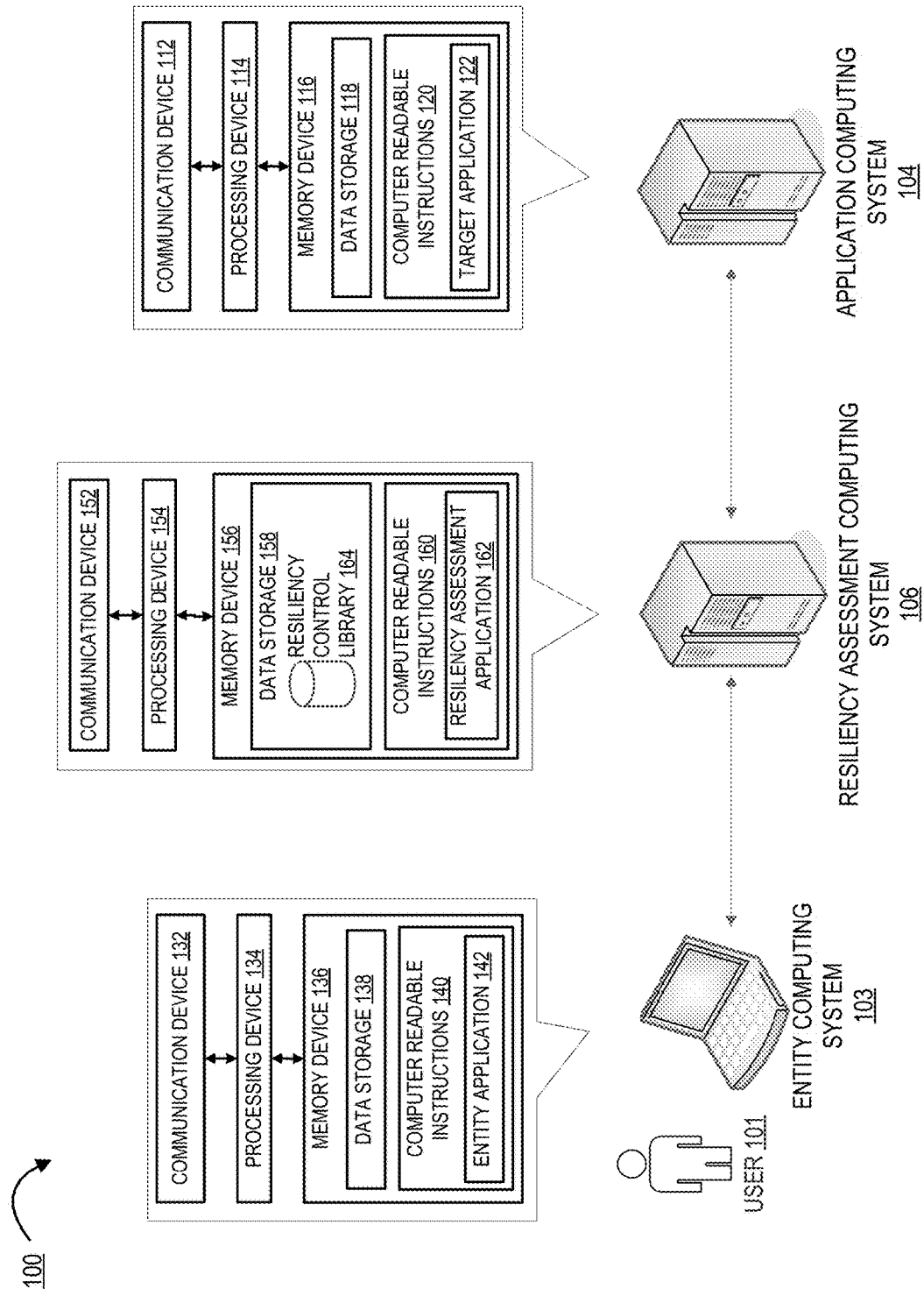
Figure 2:
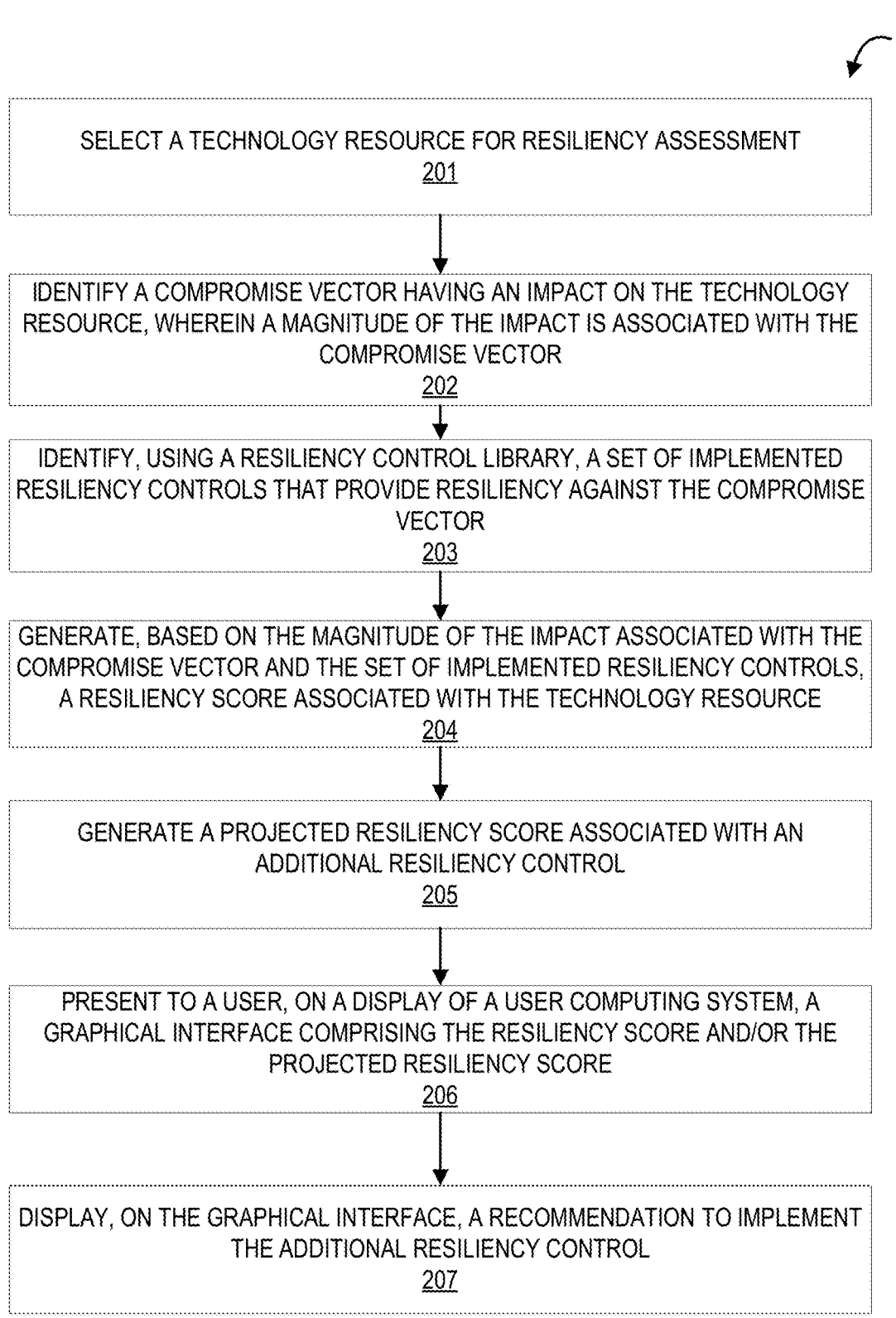
Figure 3:
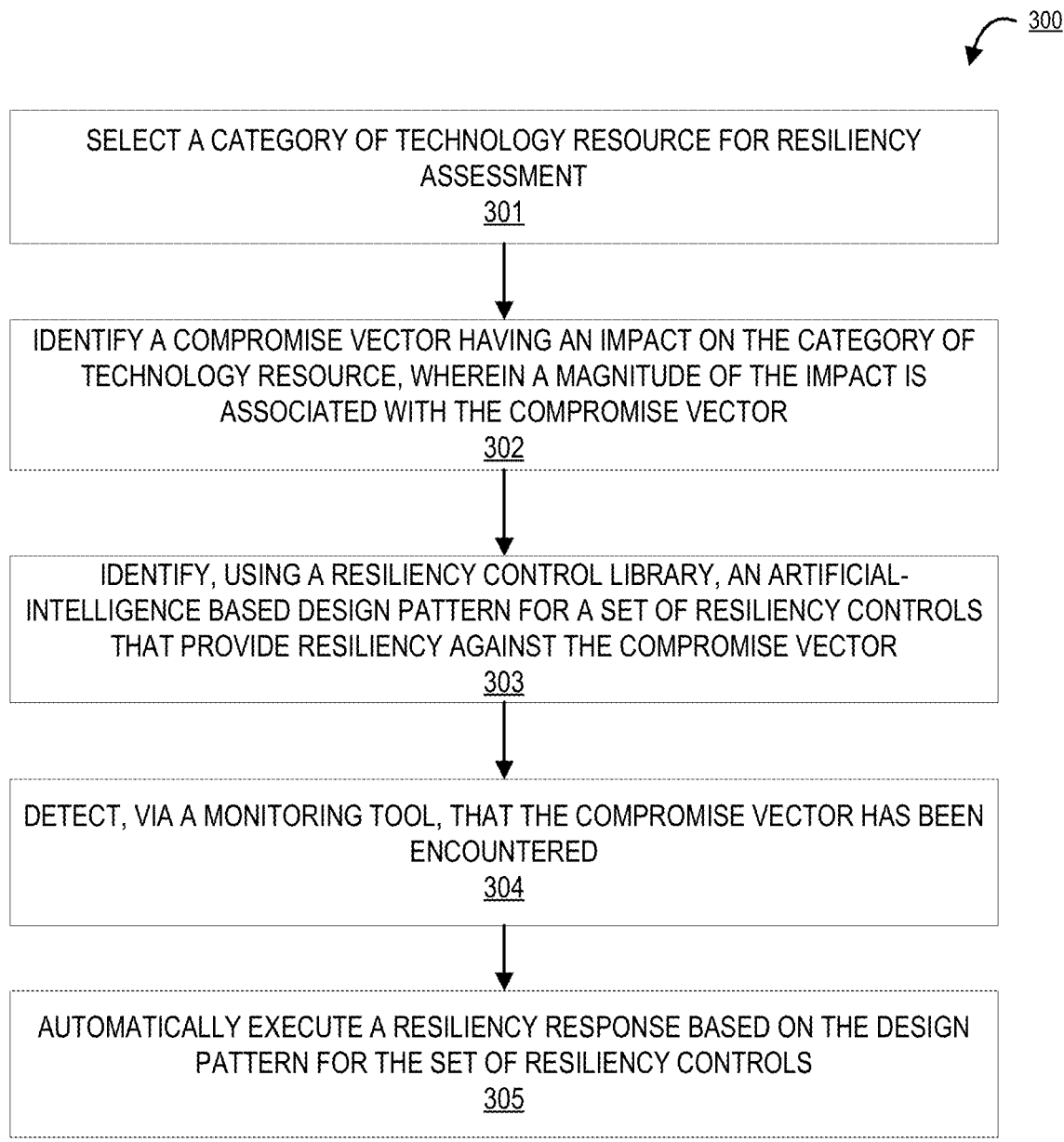

Having thus described embodiments of the invention in general terms, reference will now be made to the accompanying drawings, wherein:

FIG. 1 illustrates an operating environment for the cyber resiliency assessment system, in accordance with one embodiment of the present disclosure;

FIG. 2 illustrates a process flow for assessing resiliency of a resource using the cyber resiliency assessment system, in accordance with one embodiment of the present disclosure; and FIG. 3 illustrates a process flow for assessing resiliency of a category of resource using the cyber resiliency assessment system, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Resource" as used herein may refer to physical and virtual objects used to accomplish the entity's objectives. In this regard, "resource" may refer to applications, data, secured locations within the entity's premises, computing systems and/or hardware, computing resources (e.g., processing power, memory space, or the like), or the like.

"Resilience" or "resiliency" as used herein may refer to an ability of a resource to resist becoming compromised and/or the ability to continue to perform its functions even after being impacted or compromised. Accordingly, a resource which is able to continue to perform certain defined core functions may be considered to be "resilient."

An entity may use various types of resources within the computing environment to accomplish its objectives. Examples of such resources may include applications, computing systems, hardware devices, or the like. In this regard, an entity may wish to assess the degree of protection (e.g., cyber resiliency) of the resources against compromise or any other types of impacts to the integrity or functionality of the resources. For instance, the entity may assess an application's ability to withstand compromise vectors (e.g., unauthorized access and/or modification of applications) and vulnerabilities. Accordingly, the system may comprise a resource-centric model for assessing cyber resiliency, where the model may comprise a database containing a list of all resources in use within the entity's computing environment.

For each resource within the model, the system may identify one or more different compromise vectors (e.g., ways in which the particular resource may become compromised) as well as the magnitudes of potential impacts of the compromise vectors on the resource. Examples of such compromise vectors may include methods such as spoofing, tampering, repudiation, information disclosure, denial of service, elevation of privilege, or the like. Such compromise vectors may affect various properties of the resource, such as authenticity, integrity, non-repudiability, confidentiality, availability, or authorization of such properties.

The system may gather additional data or metadata associated with the resources and/or compromise vectors, such as the frequency of compromise, the types of resiliency controls implemented for each resource to resist the impacts of compromise, and the like. Examples of such resiliency controls may include pattern detection, authentication/authorization processes, data encryption, data recovery, or the like. Information regarding the resiliency controls (e.g., pattern data, templates, monitoring and/or response tools, executable code for automated resolution, or the like) may, in some embodiments, be stored in a library of resiliency controls. In particular, the system may perform a resiliency assessment of the ability of each resource to resist compromise by comparing the magnitude and/or frequency of compromise vectors against the effectiveness of the resiliency controls for each resource. The system may further define threshold resiliency levels for each resource, where the threshold resiliency level indicates the degree to which the resource is able to continue to serve its function in the event of compromise, which may also include the degree of recoverability from impacts caused by the compromise vectors.

Based on the assessments described above, the system may generate a resiliency assessment output which may be provided to a user for further analysis. The resiliency assessment output may be, for instance, a graphical output which may include the results of the resiliency assessment. The results may be displayed in various visual and/or auditory formats and may include graphs, charts, lists, resiliency scores, or the like. In addition to providing information regarding specific resources, the resiliency assessment output may further comprise a visualization of the resiliency of certain types or groups of resources or even the entire resource ecosystem within the networked environment. For instance, the resiliency assessment may include a display resiliency scores and/or thresholds (e.g., using a list or table) for different groups of resources (e.g., applications, hardware devices, computing systems, and the like). The resiliency assessment may further comprise a cumulative resiliency score based on a composite of individual resiliency scores of the resources and/or groups of resources. The resiliency scores may further comprise scores which measure resiliency across certain specified dimensions (e.g., resistances to particular types of vectors).

In some embodiments, the system may be configured to provide recommendations regarding resiliency controls with respect to one or more resources. In this regard, in addition to assessing the current capabilities of resources to withstand impacts from compromise vectors, the system may generate a projection of how the capabilities of such resources would change if certain resiliency controls are implemented in the future. Accordingly, the system may generate projected resiliency scores for each additional control implemented. For instance, the system may generate a first projected resiliency score based on a proposed addition of a first resiliency control. Based on comparing the first projected resiliency score with the current resiliency score, the system may calculate the degree to which the resiliency score would change if the first resiliency control is implemented. In this regard, the change in resiliency score may be present to the user via the graphical interface, where the change in resiliency score may be associated with a positive indicator (e.g., a plus sign, colored text, or the like).

The system may further generate multiple projected resiliency scores for various different resiliency controls may be implemented, as well as the changes in resiliency scores for each resiliency control. Based on the changes in resiliency scores, the system may present one or more recommendations to the user regarding which resiliency controls to implement (e.g., by selecting the resiliency controls which will provide the greatest increase in resiliency score). The recommendation may be presented to the user via a notification or alert appearing within the graphical interface. In this way, a user may be able to quickly and efficiently determine the incremental benefits of adding various resiliency controls, thereby allowing the user to selectively implement the resiliency controls having the greatest effect on the resiliency of the entity's resources.

The system as described herein confers a number of technological advantages over conventional computer security systems. For instance, the system allows a user and/or entity to quickly evaluate the resiliency of an application or resource to compromise, thereby increasing the security of the applications in use within the networked environment. Furthermore, by providing a library of resiliency controls as well as recommendations on which resiliency controls to implement, the system may provide an entity with an effective way to mitigate impacts caused by compromise of applications or resources.

Turning now to the figures, FIG. 1 illustrates an operating environment 100 for the cyber resiliency assessment system, in accordance with one embodiment of the present disclosure. In particular, FIG. 1 illustrates a resiliency assessment computing system 106 that is operatively coupled, via a network, to an application computing system 104 and an entity computing system 103. In such a configuration, the resiliency assessment computing system 106 may, in some embodiments, transmit information to and/or receive information from the application computing system 104 and/or the entity computing system 103. It should be understood that FIG. 1 illustrates only an exemplary embodiment of the operating environment 100, and it will be appreciated that one or more functions of the systems, devices, or servers as depicted in FIG. 1 may be combined into a single system, device, or server. Furthermore, a single system, device, or server as depicted in FIG. 1 may represent multiple systems, devices, or servers. For instance, though the application computing system 104 is depicted as a single unit, the system may comprise multiple application computing systems 104 that may each host or represent applications or resources to be assessed by the resiliency assessment computing system 106.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the resiliency assessment computing system 106 may be a computing system that performs authorization and/or authentication functions to provide secured access to an entity's resources. Accordingly, the resiliency assessment computing system 106 may comprise a communication device 152, a processing device 154, and a memory device 156. The resiliency assessment computing system 106 may be a device such as a networked server, desktop computer, terminal, or any other type of computing system as described herein. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 is operatively coupled to the communication device 152 and the memory device 156. The processing device 154 uses the communication device 152 to communicate with the network and other devices on the network, such as, but not limited to the application computing system 104 and/or the second entity computing system 103. The communication device 152 generally comprises a modem, antennae, WiFi or Ethernet adapter, radio transceiver, or other device for communicating with other devices on the network.

The memory device 156 may have computer-readable instructions 160 stored thereon, which in one embodiment includes the computer-readable instructions 160 of a resiliency assessment application 162 which allows the entity system to perform analysis and other functions related to the cyber resiliency of the entity's resources (e.g., applications, hardware, processes, organizations, and the like) as described elsewhere herein. In some embodiments, the memory device 156 includes data storage 158 for storing data related to the system environment. In this regard, the data storage 158 may comprise a resiliency control library 164, which may include various types of data, metadata, executable code, or other types of information regarding resiliency controls that have been implemented or may be implemented by the entity. Examples of such resiliency controls may include, for instance, backup and/or recovery functions, authorization/authentication systems, data redundancy, encryption or other methods of data obfuscation, vector monitoring, software updates and/or patching, and the like.

The resiliency assessment application 162 may comprise computer-executable program code which may instruct the processing device 154 to perform certain logic, data processing, and data storing functions of the application to accomplish the entity's objectives. For instance, the resiliency assessment application 162 may, based at least partially on the information within the resiliency control library 164, assess the resiliency of the entity's resources. In this regard, the resiliency assessment application 162 may be configured to assess the resiliency across multiple different dimensions of individual resources as well as groups of resources or functional units within the entity. The resiliency assessment application 162 may, for instance, generate one or more resiliency scores for the resources and/or groups, where the resiliency score indicates the degree to which a particular resource and/or group is able to resist impacts caused by compromise vectors. Based on the generated resiliency scores and/or the resiliency control library 164, the resiliency assessment application 162 may further generate recommendations for further resiliency controls to be implemented.

As further illustrated in FIG. 1, the application computing system 104 may represent a resource or a computing system hosting a resource, such as an application in use by the entity. In this regard, the application computing system 104 may be a computing system such as a desktop computer, server, networked terminal, or the like, or may be a portable device such as a cellular phone, smart phone, smart device, personal data assistant (PDA), laptop, or the like. The application computing system 104 may comprise a communication device 112, a processing device 114, and a memory device 116, where the processing device 114 is operatively coupled to the communication device 112 and the memory device 116. The processing device 114 uses the communication device 112 to communicate with the network and other devices on the network, such as, but not limited to the resiliency assessment computing system 106 and/or the second entity computing system 103. As such, the communication device 112 generally comprises a modem, antennae, WiFi or Ethernet adapter, radio transceiver, or other device for communicating with other devices on the network.

The application computing system 104 comprises computer-readable instructions 120 and data storage 118 stored in the memory device 116, which in one embodiment includes computer-readable instructions 120. The computer readable instructions 120 may in turn comprise a target application 122. The target application 122, along with other applications, may be among the various resources analyzed by the resiliency assessment application 162 of the resiliency assessment computing system 106. In this regard, the resiliency assessment application 162 may assess the resiliency of the target application 122 along numerous different dimensions, which may include resistance to vectors that may impact the authenticity, integrity, confidentiality, availability, authorization, or non-repudiability of the target application 122, among other possible dimensions which may be defined by the system.

As further illustrated in FIG. 1, the operating environment 100 may further comprise an entity computing system 103 in operative communication with the resiliency assessment computing system 106 and/or the application computing system 104. The entity computing system 130 may be a computing system that is operated by a user 101, such as an administrator, agent, or employee of the entity. Accordingly, the entity computing system 103 may be a device such as a desktop computer, laptop, IoT device, smartphone, tablet, single-board computer, or the like. The entity computing system 103 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The entity computing system 103 may comprise a processing device 134 operatively coupled to a communication device 132 and a memory device 136 having data storage 138 and computer readable instructions 140 stored thereon.

The computer readable instructions 140 may comprise an entity application 142 which may receive inputs from the user 101 and produce outputs to the user 101. In particular, the entity application 142 may be configured to receive data, notifications, alerts, and other types of information regarding the resiliency of various resources (e.g., the target application 122), such as resiliency scores, projected resiliency scores, recommended changes to resiliency controls, and the like. The entity application 142 may then output the above data to the user (e.g., via a graphical interface presented on the display of the entity computing system 103).

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/ or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for assessing the resiliency of a resource using the cyber resiliency assessment system, in accordance with some embodiments of the present disclosure. The process 200 begins at block 201, where the system selects a technology resource for resiliency assessment. The technology resource may be any resource for which cyber resiliency may be assessed. In this regard, the technology resource may be an application, electronic device, computing system, process, organization or structure, functional units, or the like. Accordingly, the resiliency of a particular technology resource may be assessed by the system to determine the degree to which the technology resource may continue to perform its critical functions even if affected by one or more compromise vectors.

The process continues to block 202, where the system identifies a compromise vector having an impact on the technology resource, wherein a magnitude of the impact is associated with the compromise vector. Compromise vectors may refer to unauthorized or unintended actions or consequences that may result in an impact in the functionality or security of a resource, and may include vectors such as unauthorized access or denial of access, modification, copying and/or disclosure of information, or the like. In an exemplary embodiment, a compromise vector may be a denial of service attempt that disrupts access to a resource (e.g., a particular application) by one or more authorized/ authenticated users. The magnitude of the impact of each compromise vector may be assessed along multiple different dimensions, including the authenticity, integrity, confidentiality, availability, authorization, or non-repudiation of the resource. Accordingly, the magnitude may increase along certain dimensions depending on the degree to which the resource is affected. For instance, a denial of service attempt which completely restricts availability of an application to authorized users may have a relatively high magnitude, whereas a denial of service attempt which merely slows down the rate of access may have a relatively lower magnitude.

The process continues to block 203, where the system identifies, using a resiliency control library, a set of implemented resiliency controls that provide resiliency against the compromise vector. Various resiliency controls may be implemented for each resource to protect against compromise vectors along various dimensions. Continuing the above example, resiliency controls to protect against a denial of service attempt may include load balancing, detection and blocking of unauthorized access attempts, throttling, firewalls, access blocklisting or allowlisting, or the like. Using the resiliency control library, the system may determine which resiliency controls are currently implemented for any particular resource within the entity's systems.

The process continues to block 204, where the system generates, based on the magnitude of the impact associated with the compromise vector and the set of implemented resiliency controls, a resiliency score associated with the technology resource. The system may calculate, based on the magnitude of impact, the degree (e.g., represented as numerical values) to which each resiliency control contributes to the resiliency of the application both with respect to particular dimensions and to the application overall. Accordingly, the resiliency scores may include individual resiliency scores with respect to particular resiliency controls, compromise vectors, and/or dimensions, and may further include a composite score which represents the application's overall resilience to compromise vectors. Resiliency controls which have greater abilities to mitigate impacts (e.g., along certain dimensions and/or against particular compromise vectors) may have correspondingly higher resiliency scores compared to resiliency controls which have comparatively lower abilities to mitigate such impacts.

The process continues to block 205, where the system generates a projected resiliency score associated with an additional resiliency control. The additional resiliency control may be a resiliency control which has not yet been implemented for a particular resource (e.g., a resiliency control that is not included in the previously identified set of implemented resiliency controls). Accordingly, the projected resiliency score may reflect what the resiliency score for the application and/or certain dimensions would be if the additional resiliency control were to be implemented. Accordingly, the entity may weigh the benefit of implementing the additional resiliency control (e.g., the projected resiliency score) against the steps needed to implement the additional resiliency control to gain a more complete understanding of how to structure current capabilities to withstand impacts.

The process continues to block 206, where the system presents to a user, on a display of a user computing system, a graphical interface comprising the resiliency score and/or the projected resiliency score. The user computing system may be, for instance, the entity computing system 103 as shown in FIG. 1. The graphical interface may present various types of data related to the resiliency scores and/or projected resiliency scores, such as text explanations, tables (e.g., dimensions of resiliency vs. resiliency scores), charts, graphs (e.g., line graphs of resiliency over time), and the like. Continuing the above example, the graphical interface may display a projected resiliency score and/or the delta between the current resiliency score and the projected resiliency score that would result in implementing a particular resiliency control (e.g., endpoint obfuscation). The graphical interface may display the resiliency scores for multiple dimensions of a particular resource such that the entity may be able to rapidly assess both strengths and areas needing improvement in terms of resiliency. In some embodiments, the delta may be expressed as a numerical value and a positive indicator, such as a plus sign or color coding (e.g., +15).

In some embodiments, the system may comprise a historical database that includes the compromise vectors encountered by the system (e.g., a log of denial of service attempts). In such embodiments, the system may be configured to display a projected frequency or probability of encounters and/or impacts caused by certain compromise vectors. By displaying the frequency or probability of various compromise vectors, the entity may further be able to efficiently prioritize implementation of controls based on the likelihood that the system will encounter particular compromise vectors over others.

The process concludes at block 207, where the system displays, on the graphical interface, a recommendation to implement the additional resiliency control. The recommendation may be based on factors such as the projected resiliency score in comparison to the current resiliency score, the frequency or probability of encountering a particular compromise vector, the cost of implementing the additional resiliency control, and the like. In embodiments in which multiple recommendations are presented on the graphical interface, the recommendations may be sorted and/or classified according to factors such as the priority/critical nature of the resource, the potential impact on the resource, the expected timing of key events or compromise vector encounters, or the like. In this way, the system may provide an entity with a roadmap of how to increase resiliency with respect to any particular resource, categories of resources, or the entire resource environment, including functional units or organizational structures therein.

FIG. 3 illustrates a process flow for assessing the resiliency of a category of resource using the cyber resiliency assessment system, in accordance with one embodiment of the present disclosure. The process begins at block 301, where the system selects a category of technology resource for resiliency assessment. At this stage, technology resources may be grouped into categories based on various factors, such as their relatedness of function, use in certain organizational groups or functional units within the entity, impacts from certain compromise vectors, and the like. Accordingly, in addition to performing resiliency assessments of particular resources or applications, the system may further perform such assessments on categories of resources to allow an entity to assess the entirety of the technology resource environment across multiple dimensions.

The process continues to block 302, where the system identifies a compromise vector having an impact on the category of technology resource, wherein a magnitude of the impact is associated with the compromise vector. The system may take into account multiple magnitudes of impact on various resources and/or dimensions within the category of technology resources. For instance, if multiple applications fall within the same category, the system may assess the impact on each application along one or more dimensions, as described elsewhere herein.

The process continues to block 303, where the system identifies, using a resiliency control library, an artificial intelligence-based design pattern for a set of resiliency controls that provides resiliency against the compromise vector. The artificial intelligence-based design pattern may include, for instance, learned or constructed patterns for using certain resiliency controls to counteract (e.g., prevent and/or remediate) impacts caused by identified compromise vectors. In this regard, the resiliency control library may be continuously updated with new and/or modified design patterns based on the feedback/outcomes of applying design patterns in response to compromise vectors. For example, if the system detects that an unauthorized user is attempting to create a denial of service of certain applications, a design pattern may include resiliency controls to both prevent damage from occurring (e.g., by rejecting further connections from the same user, computing system, IP address, or the like) and/or remediating the impact (e.g., by performing load/traffic balancing to minimize the affects of the denial of service attempt). Over time, the system may learn which resiliency controls, if implemented, are most effective in redressing impacts from compromise vectors, thereby allowing the design patterns to be tweaked to optimize the resiliency of affected resources.

The process continues to block 304, where the system detects, via a monitoring tool, that the compromise vector has been encountered. The monitoring tool may be an application that continuously scans the condition of the resources within the entity's environment (e.g., data security, network traffic, file integrity, system load, and the like). Accordingly, the monitoring tool may be configured to detect when an impact from a compromise vector has occurred.

The process continues to block 305, automatically execute a resiliency response based on the design pattern for the set of resiliency controls. In this regard, the design pattern may contain executable code that automatically, upon detection of the compromise vector, implements the associated resiliency controls to address the compromise vector. Continuing the above example, the system may automatically begin blocking incoming requests from the unauthorized user and/or perform load balancing of network traffic to ensure that authorized users experience minimal effects from the denial of service attempt. In some embodiments, the system may further perform resiliency assessment as described above and provide recommendations to add certain resiliency controls to the design patterns. For instance, if a particular resiliency control that is not currently a part of the design pattern would be effective in increasing the resiliency of the applications and/or resources addressed by the design pattern, the system may display a notification on the graphical display of a user computing system which recommends the addition of the resiliency control to the design pattern. In this regard, the notification may comprise an interactive link (e.g., clickable/touchable button, hyperlink, text box, or the like) corresponding with the user's confirmation of the recommendation. Once the user activates the interactive link, the system may add the resiliency control to the design pattern such that the resiliency control is automatically deployed in addition to the other resiliency controls in the design pattern upon detecting a compromise vector. In this way, the system may be used to dynamically prevent and remediate impacts caused by compromise vectors which may affect the entity's operations.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. Pat. application Ser. No. | Title | Filed On |
|---|---|---|---|
| 9405US1.014033.3568 | To be assigned | SYSTEM FOR GENERATION AND IMPLEMENTATION OF RESILIENCY CONTROLS FOR SECURING TECHNOLOGY RESOURCES | Concurrently herewith |

What is claimed is:

1. A system for technology resource centric rapid resiliency modeling, the system comprising:
a memory device with computer-readable program code stored thereon;
a communication device; and
a processing device operatively coupled to the memory device and the communication device, wherein the processing device is configured to execute the computer-readable program code to:
select a technology resource for resiliency assessment;
identify a compromise vector having an impact on the technology resource, wherein a magnitude of the impact is associated with the compromise vector, wherein the magnitude of the impact is computed based on a threshold resiliency level of the technology resource, wherein the threshold resiliency level indicates a degree to which the technology resource is able to continue to serve a function after the impact and a degree of recoverability from the impact;
identify, using a resiliency control library, a set of implemented resiliency controls that provide resiliency against the compromise vector;
generate, based on the magnitude of the impact associated with the compromise vector and the set of implemented resiliency controls, a resiliency score associated with the technology resource; and
present to a user, on a display of a user computing system, a graphical interface comprising the resiliency score and the threshold resiliency level.

2. The system according to claim 1, wherein the computer-readable program code further causes the processing device to:
generate a projected resiliency score associated with an additional resiliency control;
display, on the graphical interface, the projected resiliency score; and
display, on the graphical interface, a recommendation to implement the additional resiliency control.

3. The system according to claim 1, wherein the resiliency score is a composite resiliency score generated from a plurality of individual resiliency scores across a plurality of dimensions.

4. The system according to claim 1, wherein the compromise vector comprises at least one of a denial of service attempt, unauthorized access, or data modification.

5. The system according to claim 1, wherein the impact on the technology resource affects at least one of authorization, authentication, integrity, or availability of the technology resource.

6. The system according to claim 1, wherein the computer-readable program code further causes the processing device to display, on the graphical interface, a delta between the resiliency score and a projected resiliency score.

7. The system according to claim 1, wherein the computer-readable program code further causes the processing device to display a frequency for encountering the compromise vector.

8. A computer program product for technology resource centric rapid resiliency modeling, the computer program product comprising at least one non-transitory computer readable medium having computer-readable program code portions embodied therein, the computer-readable program code portions comprising executable code portions for:
selecting a technology resource for resiliency assessment;
identifying a compromise vector having an impact on the technology resource, wherein a magnitude of the impact is associated with the compromise vector, wherein the magnitude of the impact is computed based on a threshold resiliency level of the technology resource, wherein the threshold resiliency level indicates a degree to which the technology resource is able to continue to serve a function after the impact and a degree of recoverability from the impact;
identifying, using a resiliency control library, a set of implemented resiliency controls that provide resiliency against the compromise vector;
generating, based on the magnitude of the impact associated with the compromise vector and the set of implemented resiliency controls, a resiliency score associated with the technology resource; and
presenting to a user, on a display of a user computing system, a graphical interface comprising the resiliency score and the threshold resiliency level.

9. The computer program product according to claim 8, wherein the computer-readable program code portions further comprise executable code portions for:
generating a projected resiliency score associated with an additional resiliency control;
displaying, on the graphical interface, the projected resiliency score; and
displaying, on the graphical interface, a recommendation to implement the additional resiliency control.

10. The computer program product according to claim 8, wherein the resiliency score is a composite resiliency score generated from a plurality of individual resiliency scores across a plurality of dimensions.

11. The computer program product according to claim 8, wherein the compromise vector comprises at least one of a denial of service attempt, unauthorized access, or data modification.

12. The computer program product according to claim 8, wherein the impact on the technology resource affects at least one of authorization, authentication, integrity, or availability of the technology resource.

13. The computer program product according to claim 8, wherein the computer-readable program code portions further comprise executable code portions for displaying, on the graphical interface, a delta between the resiliency score and a projected resiliency score.

14. A computer-implemented method for technology resource centric rapid resiliency modeling, wherein the method comprises:
selecting a technology resource for resiliency assessment;
identifying a compromise vector having an impact on the technology resource, wherein a magnitude of the impact is associated with the compromise vector, wherein the magnitude of the impact is computed based on a threshold resiliency level of the technology resource, wherein the threshold resiliency level indicates a degree to which the technology resource is able to continue to serve a function after the impact and a degree of recoverability from the impact;

identifying, using a resiliency control library, a set of implemented resiliency controls that provide resiliency against the compromise vector;

generating, based on the magnitude of the impact associated with the compromise vector and the set of implemented resiliency controls, a resiliency score associated with the technology resource; and presenting to a user, on a display of a user computing system, a graphical interface comprising the resiliency score and the threshold resiliency level.

15. The computer-implemented method according to claim 14, the method further comprising:

generating a projected resiliency score associated with an additional resiliency control;

displaying, on the graphical interface, the projected resiliency score; and displaying, on the graphical interface, a recommendation to implement the additional resiliency control.

16. The computer-implemented method according to claim 14, wherein the resiliency score is a composite resiliency score generated from a plurality of individual resiliency scores across a plurality of dimensions.

17. The computer-implemented method according to claim 14, wherein the compromise vector comprises at least one of a denial of service attempt, unauthorized access, or data modification.

18. The computer-implemented method according to claim 14, wherein the impact on the technology resource affects at least one of authorization, authentication, integrity, or availability of the technology resource.

19. The computer-implemented method according to claim 14, the method further comprising displaying, on the graphical interface, a delta between the resiliency score and a projected resiliency score.

20. The computer-implemented method according to claim 14, the method further comprising displaying a frequency for encountering the compromise vector.

* * * * *